Aug. 8, 1939.　　　K. L. SCHIFF　　　2,168,630
VEHICLE
Filed Aug. 19, 1937　　2 Sheets—Sheet 1

Inventor,
Karl Ludwig Schiff,
By Toulmin & Toulmin
Attys.

Aug. 8, 1939.  K. L. SCHIFF  2,168,630
VEHICLE
Filed Aug. 19, 1937   2 Sheets-Sheet 2
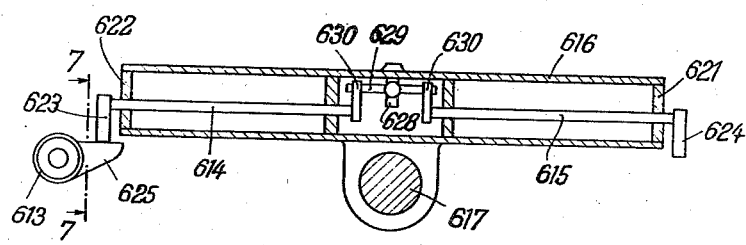
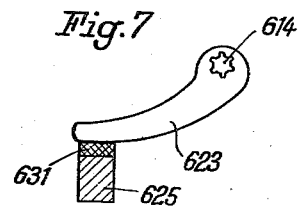
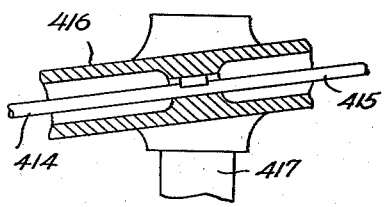
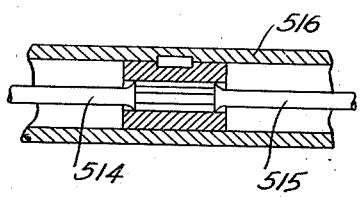
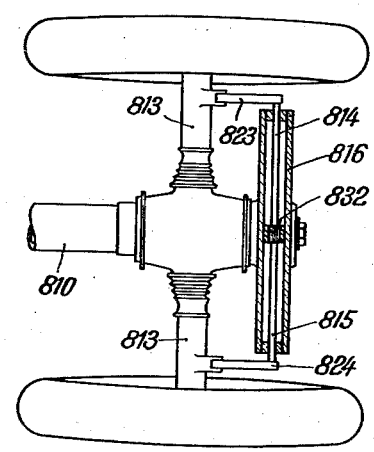

Patented Aug. 8, 1939

2,168,630

UNITED STATES PATENT OFFICE 2,168,630

VEHICLE

Karl Ludwig Schiff, Berlin-Marienfelde, Germany

Application August 19, 1937, Serial No. 159,980
In Germany August 26, 1936

3 Claims. (Cl. 280—104)

My invention relates to a vehicle and more particularly to the suspension and springing of the wheels of a motor driven vehicle.

The primary object of my invention is an improved arrangement of springs formed by torsional bars in which the stresses set up in bars coordinated to different wheels are so equalized as to result in an improved distribution of the load.

My invention is particularly applicable to vehicles of the type in which two pairs of wheels are arranged closely adjacent to each other in tandem relation, for instance to trucks having three pairs of wheels two of which are disposed in the rear close to each other. In vehicles of this kind it is highly desirable that the load should be as evenly distributed over the four wheels as possible.

I attain this and other objects by individually coordinating torsional spring bars to the wheels and by so interconnecting these spring bars that the stresses produced therein will be mutually transmitted and equalized.

Further objects of my invention will appear from the description of various embodiments following hereinafter and the features of novelty will be pointed out in the claims.

In the drawings,

Fig. 1 is a partial plan view of the rear end of a chassis provided with torsional spring bars according to my invention, Fig. 2 is a vertical partial section taken along line 2—2 of Fig. 1, Fig. 3 is a partial section taken along line 3—3 of Fig. 1, Fig. 4 is a partial plan view, similar to Fig. 1, of a modification in which the torsional spring bar sections of two wheels are integral with one another, Fig. 5 is a view similar to that of Fig. 4 of still another modification, Fig. 6 is a vertical longitudinal section, similar to that of Fig. 2, of a further embodiment of my invention, Fig. 7 is a section taken along line 7—7 of Fig. 6, Fig. 8 is a plan view of the rear section of a chassis in which my invention is applied to two co-axial wheels.

Fig. 9 is an enlarged cross-section view of the center of the holder illustrated in Fig. 5.

Fig. 10 shows a modification of the arrangement shown in Fig. 4.

Figure 1:
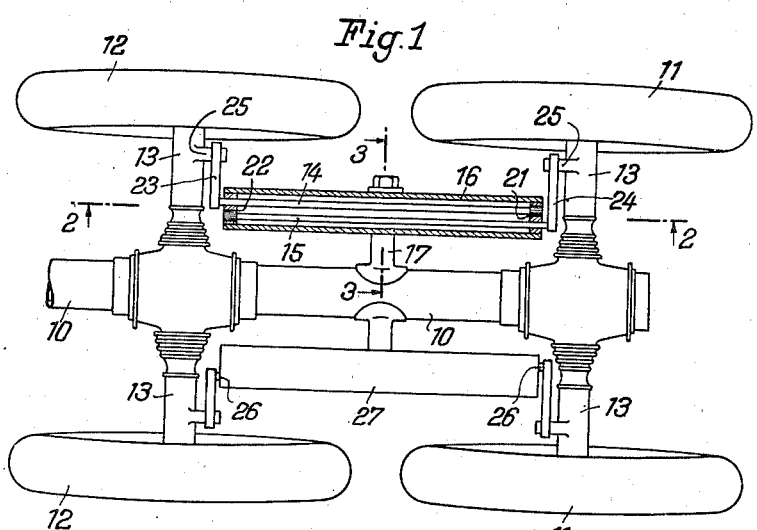
Figure 2:
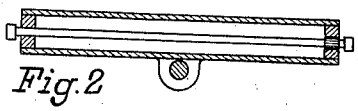

The frame of the vehicle is substantially formed by a central longitudinal tubular beam 10 to which the engine, the wheel suspending means, the springs and the body of the vehicle are suitably attached. Two pairs of wheels 11 and 12 are arranged closely to each other in tandem relationship in the rear of the vehicle as customary with trucks or other heavy vehicles equipped with 6 or more wheels. The means for guiding the wheels 11 and 12 relative to the frame 10 for up and down movement may comprise axles 13 on which the wheels are journalled and which are pivotally connected to the central tube 10 to be swingable within a vertical transverse plane of the vehicle. As the hinges or other means effecting such pivotal movement are well-known in the art, a detailed illustration and description thereof may be dispensed with. It is to be understood, however, that my invention is in no way limited to the structure so far described but is equally applicable to a structure in which other means are used for guiding the wheels relative to the frame.

The up and down movement of the wheels relative to the frame is constrained by torsional spring bars 14 and 15 which are individually coordinated to the wheels.

In order to uniformly distribute the load over the wheels 11 and 12, I have provided a connection between the spring bars 14 and 15 which is adapted to mutually transmit and equalize the stresses produced therein. In the embodiment of Fig. 1 this connection is formed by a common holder 16 in which the two spring bars 14 and 15 are mounted and which is pivotal about a transverse axis.

Figure 3:
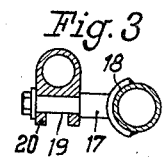

As shown in Fig. 3, a stud 17 is carried by a flange 18 which is laterally attached to the tubular beam 10 between the pairs of wheels 11 and 12, for instance by welding, and carries a bearing sleeve 19 on which depending flanges 20 of the tubular holder 16 are supported. The tubular holder 16 which extends substantially parallel to the beam 10 is provided with rigid end walls 21 and 22 formed with bores accomodating the ends of the spring bars.

The spring bar 14 has one end attached to the wall 21, for instance by a splined connection, while its other end is freely rotatably mounted in the wall 22 and projects beyond the same and carries an arm 23 rigidly attached thereto. The other spring bar 15 is similarly mounted. Its one end, however, is firmly attached to the wall 22 while its other end is journalled in the wall 21 and carries an arm 24. The two arms 23 and 24 bear on projections 25 of the axles 13. In this manner the holder constitutes a rigid interconnection between the attached ends of the spring bars.

Two spring bars 26 are carried by a holder 27 similarly provided on the other side of the beam 10.

The load of the vehicle is transmitted to the two spring holders 16 and 27, and as either spring holder is pivotal about the stud 17, it will equally distribute its share of the load to the two torsional bars 14 and 15 which in their turn transmit the load through the arms 23 and 24 to the axles 13 of the wheels 11 and 12.

When the wheel 12 passes over an obstacle while the wheel 11 is running on the level of the road, the projection 25 coordinated to the wheel 12 is raised and tends accordingly to increase the torsional stress set up in the bar 14. This increase will exert a lifting component on the wall 22 thus tending to turn the holder 16 about the stud 17 whereby the pressure exerted by the wall 21 on the bar 15 is increased accordingly. This increase, however, results in a similar increase of the torsional stress of the bar 15. Hence it will appear, that the pivotal holder 16 carrying the two torsional spring bars 14 and 15 constitutes in effect a connection between the spring bars which will mutually transmit and equalize the stresses produced therein.

A result of this equalization of stresses is, for instance, the fact that the stresses set up in the torsional bars 14 and 15 by the load of the vehicle will not be changed when the wheel 11 passes through a hole while the wheel 12 runs at the same time over an obstacle of similar size. In this event, the angular position of the two arms 23 and 24 relative to the holder 16 will not be changed but the holder 16 will swing on its transverse pivot only, thus permitting the wheels 11 and 21 to perform their movements without adding to the stresses set up in the torsional spring bars.

My invention is capable of numerous modifications.

Figure 4:
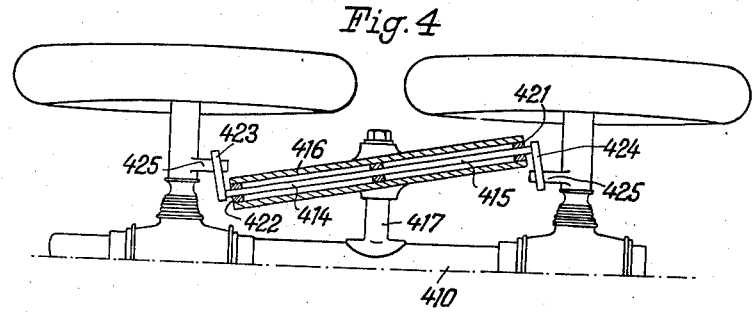

In Fig. 4 the two spring bar sections 414 and 415 mounted in the holder 416 are coaxially arranged therein. The arms 423 and 424 are mounted to extend in opposite directions. The holder 416 extends obliquely to the stud 417 in order to permit the two projections 425 of the axles to be equally spaced from the central beam 410.

The outer ends of the two spring bar sections 414 and 415 are freely pivotally mounted in the end walls 421 and 422 of the holder 416 whereas the adjacent inner ends of the spring bar sections are mounted in a central partition of the holder 416 and are secured against rotation therein by a splined connection. The function is the same as that described with reference to Fig. 1. If desired, however, the two spring bar sections 414 and 415 may be made integral as shown in Fig. 10 and, in this event, the means for securing the inner ends of the spring bar sections against rotation may be dispensed with. Therefore, in this event, the two spring bar sections are virtually constituted by a single bar which is freely rotatably mounted throughout its length in the holder 416. Moreover it is apparent that with such a direct interconnection of the two spring bars 414 and 415 the common holder 416 may be firmly attached on the stud 417, as any stress set up in one of the two spring bars will be directly transmitted to the other spring bar.

Figure 5:
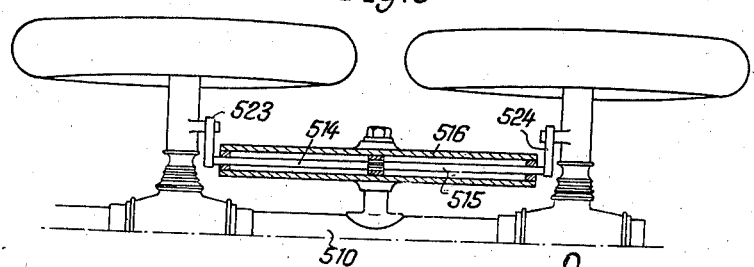

The embodiment shown in Fig. 5 differs from that in Fig. 4 only by the parallel relationship of the holder 516 to the beam 510, by the disposition of the arms 523 and 524 pointing in the same direction, by the bars 414 and 415 being integral with each other and by the rigid connection of the torsional bar sections 514 and 515 to a central partition of the holder 516. The function is similar to that described with reference to Fig. 1.

In the embodiment of Fig. 6 the tubular holder 616 which is pivotally mounted on the transverse stud 617 is provided with an internal vertical stud 628 on which a double-armed lever 629 is pivotally mounted. Coaxially rotatably mounted within partitions and end walls of the holder 616 there are two torsional spring bars 614 and 615 carrying on their inner ends upwardly extending arms 630 bearing on the ends of the equalizing lever 629; the free ends of the bars 614 and 615 extending through the end walls 621 and 622 are attached to arms 623 and 624 which are similar to and have the same function as the arms 23 and 24 of Fig. 1.

In Fig. 7 I have shown the arm 623 splined to the ends of the bar 614. The end of the arm 623 bears on a projection 625 of the axle 613 which is provided with a rubber pad 631.

In this embodiment the holder 616 may be rigidly attached to the central frame tube as any stress set up in one of the two bars 614, 615 will be transmitted to the other torsional bar by the action of the equalizing lever 629 as will readily appear from a consideration of Fig. 6.

Fig. 8 illustrates the application of my invention to the equalization of the load between two coaxially mounted wheels. In this embodiment the tubular holder 816 supports two coaxially arranged spring bar sections 814 and 815 which are integral with each other and are secured against rotation in a central partition 832 in a manner similar to Fig. 5. The arms 823 and 824 attached to the ends of the torsional spring bar sections bear on projections of the axles 813 which are mounted to be swingable in a common transverse plane of the vehicle about the central beam 810.

The equalizing effect produced by the pivotal mounting of the holder 816 is the same as that described with reference to the other embodiments, except that the load distribution takes place between two coaxial wheels instead of between two wheels arranged one behind the other.

As I have shown particularly with reference to Figs. 4 and 5 that the two spring bars individually coordinated to two wheels may be, in fact, constituted by two sections of a single integral bar, it is to be understood that the reference in the claims to two torsional spring bar sections is inclusive of two sections of a single bar.

While I have described my invention as applied to the independently sprung wheels of a motor driven vehicle, I wish it to be understood that my invention is not limited thereto but is equally applicable to other than motor driven vehicles and to other wheel guiding means than to swinging axles.

Numerous further modifications of my invention will readily appear to anyone skilled in the art.

What I claim is:
1. In a vehicle, the combination comprising a frame, two wheel carriers, wheels guided thereby for up and down movement relative to said frame, a spring holder extending between said carriers, means for mounting said holder on said frame for pivotal movement about a transverse axis, two torsional spring bars supported by said holder and extending substantially longitudinally thereof and having one of their ends rotatably mounted in the ends of said holder adjacent to said carriers and having their other ends rigidly connected, arms attached to the rotatable ends of said spring bars and mounted to be turned in response to up and down movement of said carriers, whereby up and down motion of either wheel will impart pivotal movement to said holder so as to equally tension both spring bars.

2. In a vehicle, the combination comprising a frame, two wheel carriers, wheels guided thereby for up and down movement relative to said frame, a spring holder extending between said carriers, means for mounting said holder on said frame for pivotal movement about a transverse axis, two torsional spring bar sections integral with each other and journalled in said holder and extending substantially longitudinally thereof and having their ends rotatably mounted in the ends of said holder adjacent to said carriers, and arms attached to the rotatable ends of said spring bar sections and mounted to be turned in opposite directions in response to up and down movement of said carriers, whereby up and down motion of either wheel will impart pivotal movement to said holder so as to equally tension both spring bar sections.

3. In a vehicle, the combination comprising a central frame beam, two swingable axles pivoted to said beam in tandem relation, wheels mounted on said axles, a spring holder extending between said axles substantially parallel to said beam, means for mounting said holder on said beam for pivotal movement about a transverse axis, two torsional spring bars supported by said holder and extending longitudinally thereof and having one of their ends rotatably mounted in the ends of said holder adjacent to said axles and having their other ends rigidly connected, and arms attached to the rotatable ends of said spring bars and bearing on said axles, whereby up and down motion of either axle will impart a pivotal movement to said holder so as to equally tension both spring bars.

KARL LUDWIG SCHIFF.